United States Patent
Rosencwaig et al.

(10) Patent No.: US 6,813,034 B2
(45) Date of Patent: Nov. 2, 2004

(54) ANALYSIS OF ISOLATED AND APERIODIC STRUCTURES WITH SIMULTANEOUS MULTIPLE ANGLE OF INCIDENCE MEASUREMENTS

(75) Inventors: Allan Rosencwaig, Danville, CA (US); Jon Opsal, Livermore, CA (US)

(73) Assignee: Therma-Wave, Inc., Fremont, CA (US)

( * ) Notice: Subject to any disclaimer, the term of this patent is extended or adjusted under 35 U.S.C. 154(b) by 0 days.

(21) Appl. No.: 10/243,245

(22) Filed: Sep. 13, 2002

(65) Prior Publication Data

US 2003/0147086 A1 Aug. 7, 2003

Related U.S. Application Data

(60) Provisional application No. 60/355,729, filed on Feb. 5, 2002, and provisional application No. 60/356,074, filed on Feb. 11, 2002.

(51) Int. Cl.[7] .............................................. G01B 11/24
(52) U.S. Cl. .................................. 356/601; 250/237 G
(58) Field of Search .............................. 356/601, 614, 356/625, 636, 512–513, 453, 485, 492; 250/237 G, 559.4, 559.19, 559.22, 559.42

(56) References Cited

U.S. PATENT DOCUMENTS

| | | | |
|---|---|---|---|
| 4,710,642 A | 12/1987 | McNeil | 250/571 |
| 4,999,014 A | 3/1991 | Gold et al. | 356/382 |
| 5,042,951 A | 8/1991 | Gold et al. | 356/369 |
| 5,159,412 A | 10/1992 | Willenborg et al. | 356/445 |
| 5,166,752 A | 11/1992 | Spanier et al. | 356/369 |
| 5,181,080 A | 1/1993 | Fanton et al. | 356/381 |
| 5,264,912 A * | 11/1993 | Vaught et al. | 356/237.5 |
| 5,412,473 A | 5/1995 | Rosencwaig et al. | 356/351 |
| 5,432,607 A * | 7/1995 | Taubenblatt | 356/364 |
| 5,596,411 A | 1/1997 | Fanton et al. | 356/369 |
| 5,739,909 A | 4/1998 | Blayo et al. | 356/369 |
| 5,867,276 A * | 2/1999 | McNeil et al. | 356/445 |
| 5,880,838 A * | 3/1999 | Marx et al. | 356/498 |
| 5,889,593 A | 3/1999 | Bareket | 356/445 |
| 5,963,329 A | 10/1999 | Conrad et al. | 356/372 |
| 6,278,519 B1 | 8/2001 | Rosencwaig et al. | 356/369 |
| 6,383,824 B1 * | 5/2002 | Lensing | 438/14 |
| 6,429,943 B1 | 8/2002 | Opsal et al. | 356/625 |
| 2002/0101585 A1 | 8/2002 | Bensch et al. | 356/237.4 |

FOREIGN PATENT DOCUMENTS

| | | | | |
|---|---|---|---|---|
| DE | 199 14 696 A1 | 3/1999 | | G01N/21/41 |
| WO | WO 02/065545 | 8/2002 | | H01N/21/66 |

OTHER PUBLICATIONS

D.S. Marx et al., "Polarization quadrature measurement of subwavelength diffracting structures," *Applied Optics*, vol. 36, No. 25, Sep. 1, 1997, pp. 6434–6440.

X. Wang et al., "Measuring and modeling optical diffraction from subwavelength features," *J. Opt. Soc. Am. A*, vol. 18, No. 3, Mar. 2001, pp. 565–572.

D.S. Marx et al., "Optical diffraction of focused spots and subwavelength structures," *J. Opt. Soc. Am. A*, vol. 14, No. 6, Jun. 1997, pp. 1268–1278.

J. Opsal et al., "Effects of feature edges on thickness readings of thin oxides," *SPIE (Process Module Metrology, Control, and Clustering*, vol. 1594 (1991), pp. 313–321.

* cited by examiner

*Primary Examiner*—Frank G. Font
*Assistant Examiner*—Sang H. Nguyen
(74) *Attorney, Agent, or Firm*—Stallman & Pollock LLP (57) ABSTRACT

A method is disclosed for evaluating isolated and aperiodic structure on a semiconductor sample. A probe beam from a coherent laser source is focused onto the structure in a manner to create a spread of angles incidence. The reflected light is monitored with an array detector. The intensity or polarization state of the reflected beam as a function of radial position within the beam is measured. Each measurement includes both specularly reflected light as well as light that has been scattered from the aperiodic structure into that detection position. The resulting output is evaluated using an aperiodic analysis to determine the geometry of the structure.

15 Claims, 4 Drawing Sheets

ANALYSIS OF ISOLATED AND APERIODIC STRUCTURES WITH SIMULTANEOUS MULTIPLE ANGLE OF INCIDENCE MEASUREMENTS

PRIORITY CLAIM

This application claims priority from prior provisional applications Ser. No. 60/355,729, filed Feb. 5, 2002 and 60/356,074, filed Feb. 11, 2002, both of which are incorporated herein by reference.

TECHNICAL FIELD

The subject invention relates to optical metrology equipment for measuring critical dimensions and feature profiles of isolated and aperiodic structures on semiconductor wafers. The invention is implemented using data obtained from simultaneous multiple angle of incidence measurements as an input to analytical software designed to evaluate surface features via a scatterometry approach.

BACKGROUND

There is considerable interest in measuring small geometrical structures formed on semiconductor wafers. These structures correspond to physical features of the device including conductive lines, holes, vias and trenches as well as alignment or overlay registration markings. These features are typically too small to be measured with conventional optical microscopes. Accordingly, optical scatterometry techniques have been developed to address this need.

In a conventional optical scatterometry system, a light beam is directed to reflect of a periodic structure. The periodic structure acts as an optical grating, scattering some of the light. The light reflected from the sample is then measured. Some systems measure light diffracted into one or more higher orders. Other systems measure only the specularly reflected light and then deduce the amount of light scattered into higher orders. In any event, the measurements are analyzed using scattering theory, for example, a Rigorous Coupled Wave Analysis, to determine the geometry of the periodic structure.

Rigorous Coupled Wave Theory and other similar techniques rely upon the assumption that the structure which is being inspected is essentially periodic. To match theory to experiment, the diameter of the light beam spot on the sample is typically significantly larger than individual features on the test structure and encompasses many cycles of the grating. Most prior art systems operate wherein the probe light beam spot overlaps at least twenty repeating patterns so that the diffraction analysis will have statistical significance. The results of the analysis represent an average of the geometry illuminated by the probe beam.

In real world semiconductor devices, many (if not most) features are isolated or aperiodic. These isolated structures cannot not evaluated with the grating analysis approaches described above. Accordingly, in order to monitor the geometry of isolated features within the dies on the wafer, manufacturers build test structures on the "streets" separating the dies. These test structures are periodic but are intended to have the same geometry (e.g. width, shape) as individual features within the die. By measuring the shape of the tests structures, one can gain information about the structure in the dies or overlay registration.

This latter approach has been finding acceptance in the industry. Examples of prior art systems which rely on scatterometry techniques can be found in U.S. Pat. Nos. 5,867,276; 5,963,329; and 5,739,909. These patents describe using both spectrophotometry and spectroscopic ellipsometry to analyze periodic structures and are incorporated herein by reference. See also PCT publication WO 02/065545, incorporated herein by reference which describes using scatterometry techniques to perform overlay metrology.

In addition to multiple wavelength measurements, multiple angle measurements have also been disclosed. In such systems, both the detector and sample are rotated in order to obtain measurements at both multiple angles of incidence and multiple angles of reflection. (See, U.S. Pat. No. 4,710,642)

About fifteen years ago, the assignee herein developed and commercialized a multiple angle of incidence measurement system which did not require tilting the sample or moving the optics. This system is now conventionally known as Beam Profile Reflectometry® (BPR®). This and related systems are described in the following U.S. Pat. No. 4,999,014; 5,042,951; 5,181,080; 5,412,473 and 5,596,411, all incorporated herein by reference. The assignee manufactures a commercial device, the Opti-Probe which takes advantage of some of these simultaneous, multiple angle of incidence systems. A summary of all of the metrology devices found in the Opti-Probe can be found in U.S. Pat. No. 6,278,519, incorporated herein by reference.

In the BPR tool, a probe beam from a laser is focused with a strong lens so that the rays within the probe beam strike the sample at multiple angles of incidence. The reflected beam is directed to an array photodetector. The intensity of the reflected beam as a function of radial position within the beam is measured. Each detector element captures not only the specularly reflected light but also the light that has been scattered into that detection angle from all of the incident angles. Thus, the radial positions of the rays in the beam illuminating the detector correspond to different angles of incidence on the sample plus the integrated scattering from all of the angles of incidence contained in the incident beam. The portion of the detector signal related to the specularly reflected light carries information highly influenced by the compositional characteristics of the sample. The portion of the detector signal related to the scattered light carries information influenced more by the physical geometry of the surface.

U.S. Pat. No. 5,042,951 describes an ellipsometric version of the BPR, which, in this disclosure will be referred to as Beam Profile Ellipsometry (BPE). The arrangement of the BPE tool is similar to that described for the BPR tool except that additional polarizers and/or analyzers are provided. In this arrangement, the change in polarization state of the various rays within the probe beam are monitored as a function of angle of incidence. Both the BPR and BPE tools were originally developed for thin film analysis. One advantage of these tools for thin film analysis is that the laser beam could be focused to a small spot size on the sample. In particular, the lens can produce a spot of less than five microns in diameter and preferably on the order of 1 to 2 microns in diameter. This small spot size permitted measurements in very small regions on the semiconductor.

This clear benefit in the thin film measurement field was seen as a detriment in the field of measuring and analyzing gratings with a scatterometry approach. More specifically, a spot size on the order of 1 to 2 microns encompasses less than twenty repeating lines of a conventional test grating. It was felt that such a small sampling of the structure would lead to inaccurate results.

One approach for dealing with this problem was described in U.S. Pat. No. 5,889,593 incorporated herein by reference. This patent describes adding an optical imaging array to the BPR optics which functions to break the coherent light into spatially incoherent light bundles. This forced incoherence produces a much larger spot size, on the order of ten microns in diameter. At this spot size, a suitable number of repeating features will be measured to allow analysis according to a grating theory.

In U.S. Pat. No. 6,429,943 (incorporated by reference), the inventors herein disclosed some alternate approaches for adapting BPR and BPE to measuring periodic gratings. In one approach, the laser probe beam is scanned with respect to the repeating structure to collect sufficient information to analyze the structure as a grating. In another approach, an incoherent light source is used as the probe beam. The incoherent source creates a spot size significantly larger than the laser source and thus could be used to analyze gratings.

Semiconductor manufacturers continually strive to reduce the size of features on a wafer. This size reduction also applies to the width of the streets, typically used as the location for the test structures including overlay registration markings. With narrower streets, the size of the test structures need to be reduced. Ideally, test structures could be developed that were not periodic gratings but closer in form to the actual isolated or aperiodic structures on the dies. Even more desirable would be to develop an approach which would permit measurement of the actual structures within the dies.

With today's small feature sizes, it has been generally believed that direct accurate measurements of isolated or substantially aperiodic structures could not be performed. An isolated structure would correspond to, for example, a single line, trench, hole or via or a specific alignment mark. Such a structure can have extremely small dimensions (i.e., a single line can have a width of about a tenth of a micron).

In order to optically inspect such small structures, a very small illumination spot is desirable. In the broadband applications such as those discussed above, the probe beam spot size is relatively large, on the order of 50 microns in diameter. If this probe beam was focused on an isolated structure, the portion of the measured signal attributable to the isolated structure would be extremely small. While the spot size of a laser beam is much smaller, it was not envisioned that a enough of a signal could be obtained to measure an isolated feature. Nonetheless, in initial experiments, it has been shown that BPR and BPE techniques using a laser as a probe source can generate meaningful data for isolated structures.

SUMMARY OF THE INVENTION

In accordance with this invention, an isolated structure (line, via, etc.) is monitored using an illumination source which is coherent, i.e. supplied by a laser. Such a light source can be focused to a probe beam spot size less than five microns in diameter and preferably less than two microns in diameter. While even this spot size is much larger than the feature of interest, that portion of the measured signal attributable to the feature would be much larger than in a broadband system with a much larger spot size.

The reflected probe beam is monitored with an array detector. As described in the assignee's patents cited above, when using multiple angle of incidence measurements techniques such as beam profile reflectometry (BPR) and beam profile ellipsometry (BPE), the array detector is used to simultaneously generate information as a function of angle of incidence. The measured data includes a combination of specularly reflected light at specific angles of incidence and scattered light from all of the angles of incidence. In an alternate embodiment, a baffle element is utilized to block the specularly reflected light and maximize the scattered light signal.

The multiple angle of incidence measurements provide information which can be used in a scatterometry analysis. Since the feature is aperiodic, the approach would not take the form of a grating analysis using Rigorous Coupled Wave Theory. Rather, the analysis would have to consider light scattered from the isolated structure such as by using either a boundary integral or volume integral approach.

The subject concept is not limited to investigating a single small feature, but rather, is directed in general to investigating aperiodic structures that cannot be analyzed with a simple grating model.

For example, consider a single structure whose size is larger than the probe beam spot. The measured signal could not be analyzed with a grating model, but if sufficient information is known in advance about the structure, it could be analyzed with a boundary integral approach.

Also consider a periodic structure whose size was smaller than the probe beam spot. The measured signal would be the result of an aperiodic illumination field. Such an aperiodic illumination field could be analyzed with a spatial averaging or a mixing approach (including contributions from both the structure and the surrounding area). One example might be a repeating structure having only 10 lines and where the spot was large enough to cover 10 lines (along an axis perpendicular to the longitudinal lines) as well as areas of equal size outside of the line structure.

The approach can also be used for structures which have some, but incomplete periodicity. For example, consider a line structure having edge profiles that differ over the structure. Such a structure would need to be analyzed as having an aperiodic geometry.

It should be understood that by using the appropriate analysis, one can investigate a variety of both periodic and aperiodic structures without scanning the probe beam to gain additional information. Nonetheless, it should also be understood that scanning the beam with respect to the aperiodic structure can provide additional information. Therefore, it is within the scope of the subject invention to evaluate aperiodic structures by scanning the probe beam with respect to the structure.

In addition to the structures discussed above, the subject approach can also be applied to analysis of the registration of overlying patterns created during lithography steps in semiconductor manufacturing.

DETAILED DESCRIPTION OF THE PREFERRED EMBODIMENTS

Figure 1:
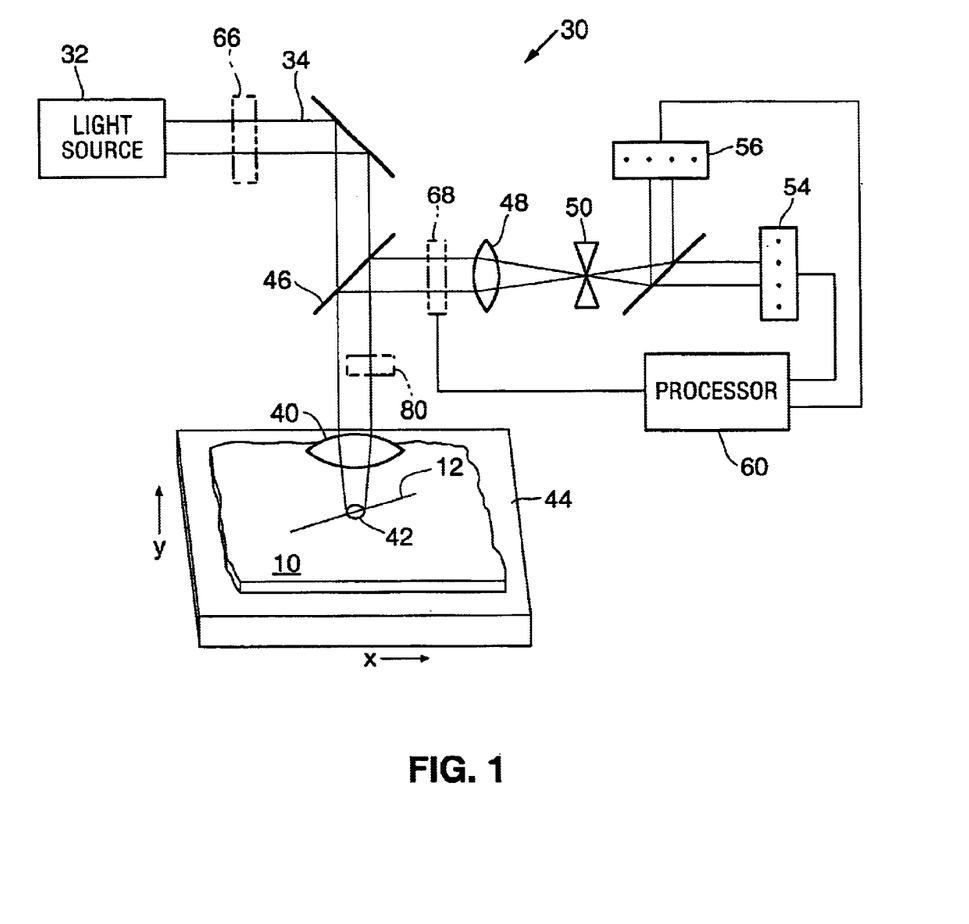
FIG. 1 is a schematic diagram of an apparatus for performing the method of the subject invention.

Turning to FIG. 1, a basic schematic diagram of a simultaneous multiple angle of incidence apparatus 30 is illustrated. Further details about such a device are described in U.S. Pat. Nos. 4,999,014; 5,042,951; 5,159,412; 5,412,473 and 6,429,943, all incorporated herein by reference. As noted above, the assignee's Opti-Probe device incorporates portions of this technology and markets the measurement subsystem under the trademarks Beam Profile Reflectometry or BPR (as well as a Beam Profile Ellipsometry (BPE) variant described in U.S. Pat. No. 5,181,080). In the past, the BPR and BPE technologies were utilized primarily to analyze the characteristics of thin films and, very recently, periodic grating structures formed on semiconductors. This disclosure is directed to using the measurements which can be obtained from this type of system to evaluate the geometry of isolated features and aperiodic structures formed on semiconductors.

The basic measurement system includes a light source 32 for generating a probe beam 34. To carry out this method, the light source should be a laser for generating a coherent beam of radiation. Laser diodes are suitable laser sources for this application. If the output of the laser is not itself polarized, a separate linear polarizer can be provided. The laser output can be coupled to a fiber delivery system as described in PCT WO 01/55671.

The probe beam 34 is focused onto the feature 12 on the sample 10 using a lens 40 in a manner so that the rays within the probe beam create a spread of angles of incidence. The sample is shown supported by a stage 44. In the preferred embodiment, the beam is directed normal to the surface of the sample but can be arranged off-axis as illustrated in U.S. Pat. No. 5,166,752, incorporated by reference. Lens 40 can be a high numerical aperture lens (on the order of 0.90 NA) to create angles of incidence from zero to about 70 degrees. A lens having an NA of at least 0.5 is preferred. A total range of angles of incidence of at least thirty degrees is also preferred. The lens creates rays having predominantly S-polarized light along one axis and predominantly P-polarized light along an orthogonal axis. At intermediate angles, the polarization is mixed.

In certain measurement situations, it may be desirable to have the probe beam 34 underfill lens 40 resulting in a lower effective numerical aperture. For example, the beam may be configured so that the effective numerical aperture is 0.5 which would create a spread of angles of incidence from zero to about 30 degrees. The actual larger NA of the lens (0.9) would be used beneficial in collecting a larger portion of the reflected and scattered light.

Lens 40 is positioned to create a probe beam spot 42 on the sample. When using a high numerical aperture lens (0.9) that is overfilled by the probe beam, a spot size having a diameter as small as two microns or less can be achieved. If a lens with a smaller NA is used, the spot size would typically be larger. In most measurements situations, it would appear desirable to have the spot size less than five microns in diameter. However, in the situation discussed above, where the lens is underfilled, the spot size could be larger than five microns.

Light reflected by the feature (both specular and scattered) is collected by the lens 40 and collimated. The reflected light is redirected by a splitter 46 to an imaging lens 48. Lens 48 magnifies and relays an image of the sample at the focal plane of the lens. A spatial filter 50 having an aperture is placed in the focal plane of the lens 48 for controlling size of the area of the sample which is measured.

The probe beam is then passed through a 50—50 splitter and directed to two photodetectors 54 and 56 having a linear array of detector elements. The photodetectors are arranged orthogonal to each other to measure both the S and P polarization components. As described in detail in the above-cited patents, each of the detecting elements in the array measures light specularly reflected from different angles of incidence. The radial position within the reflected probe beam is mapped to the angle of incidence, with the rays closer to the center of the beam having the smallest angles of incidence and the rays in the radially outer portion of the beam corresponding to the greatest angles of incidence. Thus, each detector element simultaneously generates an independent signal that correspond to a different angle of incidence on the sample plus the integrated scattering from all of the angles of incidence contained in the incident beam.

The output signals from the detector arrays are supplied to the processor 60. Processor will analyze the signals based on algorithm which considers the reflected and scattered light. The algorithms rely on the Fresnel equations. As noted above, since the structure is not periodic, Rigorous Coupled Wave Theory would not be well suited to the analysis. Rather, and as discussed below, bounded or volume integral approaches, are better suited to this problem.

The selected algorithms will correlate the variation in reflectivity as a function of the position on the detector with the geometry of the aperiodic structure. The type of analysis will depend on the application. For example, when used for process control, either in situ or near real time, the processor can compare the detected signals to an expected set of signals corresponding to the desired geometry of the aperiodic structure. If the detected signals do not match the expected signals, it is an indication that the process is not falling within the specified tolerances and should be terminated and investigated. In this approach, no sophisticated real time analysis of the signals is necessary The reflected output signals can be more rigorously analyzed to determine the specific geometry of the aperiodic structure. While there are a number of different approaches, most have certain traits in common. More specifically, the analytical approach will typically start with a theoretical "best guess" of the geometry of the measured structure. Using Fresnel equations covering both the reflection and scattering of light, calculations are applied to a theoretical model of the structure to determine what the expected measured output signals would be for the theoretical geometry. These theoretical output signals are compared to the actual measured output signals and the differences noted. Based on the differences, the processor will generate a new set of theoretical output signals corresponding to a different theoretical structure. Another comparison is made to determine if the theoretical signals are closer to the actual measured signals. These generation and comparison steps are repeated until the differences between the theoretically generated data and the actually measured data are substantially minimized. Once the differences have been minimized, the theoretical structure corresponding to the best fit theoretical data is assumed to represent the actual structure.

This minimization procedure can be carried out with a conventional least squares fitting routine such as a Levenberg-Marquardt algorithm. It would also be possible to use a genetic algorithm. (See, U.S. Pat. No. 5,953,446.)

Ideally, the minimization routine will be carried out in real time, associated with the measurements. Since the calculations related to this analysis are very complex, real time calculations can be a challenge. Some approaches for dealing with complex real time calculations are set forth in our co-pending U.S. patent application Ser. No. 09/906,290, filed Jul. 16, 2001, incorporated herein by reference.

Another approach to dealing with the processing difficulties is to create a library of solutions prior to the measurement. In this approach, a range of possible structures and their associated theoretical output signals are generated in advance. The results are stored as a library in a processor memory. During the measurement activities, the actual measured signals are compared with sets of theoretically generated output signals stored in the library. The structure associated with the set of theoretical signals which most closely matches the actual measured data is assumed to most closely represent the geometry of the measured structure. The use of libraries is disclosed in U.S. patent application 2002/0035455 A1. Still another approach is to create a much smaller database of possible solutions. Measured data can then be compared to the database and algorithms are used to interpolate between data points to derive a solution to the geometry of the structure. (See for example, U.S. patent application 2002/0038196 A1)

Theory

As noted above, an isolated feature should not be modeled in the same manner as a diffraction grating. We have addressed the issue with two different approaches. The first approach uses Fourier expansions which are analogous in many ways to the Rigorous Coupled Wave Theory. We have also developed an analysis using a boundary integral approach. Previously we have developed a boundary integral approach for periodic gratings using Green's functions. This work is described in U.S. patent application Ser. No. 10/212385, filed Aug. 5, 2002 and incorporated herein by reference.

We have found that the analysis by Fourier expansion tends to be faster than the boundary integral approach. Fourier expansion is relatively easy to implement since it is similar to the periodic case. However, the Fourier expansion approach is less stable. Further, there are more control parameters one has to adjust, including the number of integration points in the exterior and interior regions, and the cutoff integration parameter $s_0$. The boundary integral approach is more numerically involved and is more difficult to implement. However, it is more robust. We have used both approaches to evaluate isolated lines with single material in the line. The results of both approaches agree very well, indicating that our results are appropriate.

Fourier Expansions

An isolated or aperiodic feature (e.g. single line or trench) can be viewed as an array of lines or trenches with very large periods. Thus, in a approach which is analogous to the RCWA theory of the diffraction gratings, we can write the electric field as $$E(x,z) = \int dk E(k,z)e^{ikx} = k_0 \int ds E(\sin\theta, z) e^{ik_0 sx}$$

$$\approx k_0 \sum_j w_j f(s_j, z) e^{ik_0 s_j x}$$

where s is the equivalent of sin θ, the $s_j$ are the Guassian quadrature nodes, in contrast to the periodic systems where $s_j$ are equally spaced, the $w_j$ are the weights. The input electric field is written as $$E_0 = k_0 \int_{s_0}^{s_0} ds E_0(s,z) e^{ik_0 sx}$$

where $s_0 < 1$. In general, the electric field as a function of s are not analytic, we need to perform the integration in at least 3 regions, $(-\infty, -1), (-1, 1), (1, \infty)$. Furthermore, we need to have a cutoff $s_{max}$ for s so that in each region we can use Gaussian quadrature for the integrations. For TM mode, we use the equivalent of TM1 implementation.

Boundary Integral Approach

As noted above, although a Fourier expansion approach can be used, boundary or volume integral methods are ideal for isolated features in that they provide a more robust solution. The boundary integral formulation relies on the Green's theorem, the properties of the wave function and Green's functions.

For the isolated feature situation, the equation of motion for the TE mode is $$\Delta\psi(x) - \epsilon(x)\psi(x) = 0,$$

$$\Delta G(x,x') - \epsilon(x) G(x,x') = \delta(x-x').$$

and Green's theorem states that $$\int dV \psi(x) \delta(x-x') = \int dV[\psi(x)\Delta G(x,x') - \Delta\psi(x)G(x,x')]$$

$$= \begin{cases} \psi(x'), & x' \in V \\ \frac{1}{2}\psi(x'), & x' \in \Gamma \\ 0, & x' \notin V \end{cases}$$

$$= \int d\Gamma[\psi(x)\partial_n G(x,x') - \partial_n\psi(x)G(x,x')].$$

where $\Gamma$ represents the boundary of the region of interest. In our case, it is simply a curve since the y dimension is of no concern. Since the boundary conditions require that $\psi(x)$, $G(x,x')$, $\partial_n\psi(x)$, and $\partial_n G(x,x')$ be continuous across material boundaries, the volume can be extended over several materials provided that G is obtained. For TM mode, $$\nabla \epsilon^{-1} \nabla \psi(x) - \psi(x) = 0,$$

$$\nabla \epsilon^{-1} \nabla G(x,x') - G(x,x') = \delta(x-x').$$

We use modified Green's theorem $$\int dV \psi(x) \delta(x-x') = \int dV[\psi(x)\nabla \epsilon^{-1} \nabla G(x,x') - \nabla \epsilon^{-1} \nabla \psi(x) G(x,x')]$$

$$= \begin{cases} \psi(x'), & x' \in V \\ \frac{1}{2}\psi(x'), & x' \in \Gamma \\ 0, & x' \notin V \end{cases}$$

$$= \int d\Gamma \epsilon^{-1}[\psi(x)\partial_n G(x,x') - \partial_n\psi(x)G(x,x')].$$

Since the boundary conditions are $\psi(x)$, $G(x,x')$, $\epsilon^{-1}\partial_n\psi(x)$, and $\epsilon^{-1}\partial_n G(x,x')$ and are continuous, the integration is again meaningful over different material domains. We write the total field in the exterior region as a combination of incident field and scattered field $$\psi(X) = \psi_0(X) + \psi_s(X),$$

If X' is in the exterior region, we have $$\int d\Gamma n \cdot [\psi(X) \nabla G(X,X') - \nabla\psi(X)G(X,X')] =$$

$$\int d\Gamma_\infty n \cdot [\psi(X) \nabla G(X,X') - \nabla\psi(X)G(X,X')] +$$

$$\int d\Gamma_0 n \cdot [\psi(X) \nabla G(X,X') - \nabla\psi(X)G(X,X')] =$$

-continued $$\int d\Gamma_\infty n \cdot [\psi_0(X)\nabla G(X, X') - \nabla \psi_0(X)G(X, X')] +$$

$$\int d\Gamma_0 n \cdot [\psi_s(X)\nabla G(X, X') - \nabla \psi_s(X)G(X, X')] =$$

$$\psi_0(X') + \int d\Gamma_0 n \cdot [\psi_s(X)\nabla G(X, X') - \nabla \psi_s(X)G(X, X')]$$

When X' is on the boundary $\Gamma_0$, we have $$\int d\Gamma n \cdot [\psi(X)\nabla G(X, X') - \nabla \psi(X)G(X, X')] =$$

$$\psi_0(X') + \int d\Gamma_0 n \cdot [\psi(X)\nabla G(X, X') - \nabla \psi(X)G(X, X')] \frac{1}{2}\psi(X') =$$

$$\psi_0(X') - \int d\Gamma_0' n \cdot [\psi(X)\nabla G(X, X') - \nabla \psi(X)G(X, X')]$$

While in interior region, we have $$\frac{1}{2}\psi(X') = \int d\Gamma_0' n \cdot [\psi(X)\nabla G'(X, X') - \nabla \psi(X)G'(X, X')]$$

Combine the two we have $$\frac{1}{2}\psi(X') + \int d\Gamma_0' n \cdot [\psi(X)\nabla G_{ext}(X, X') - \nabla \psi(X)G_{ext}(X, X')] = \psi_0(X')$$

$$\frac{1}{2}\psi(X') - \int d\Gamma_0' n \cdot [\psi(X)\nabla G_{int}(X, X') - \nabla \psi(X)G_{int}(X, X')] = 0$$

When these last two equations are discretized either with boundary element or quadrature method, they become a set of linear equations which can be solved directly if the dimensions are relatively small or iteratively if the system is large.

We have performed initial testing using the subject method to measure an isolated trench formed on a semiconductor wafer. The wafer was silicon with a 650 nm top layer of silicon dioxide. The isolated trench had a nominal width of about 500 nanometers (0.5 microns) and a nominal depth of about 650 nanometers. A beam profile reflectometer of the type illustrated in FIG. 1 and found in the assignee's Opti-Probe system was used to measure the sample. The photodetector arrays in this system generate output signals corresponding to angles of incidence ranging from about +70 degrees to –70 degrees around the normal to the sample.

Figure 2:
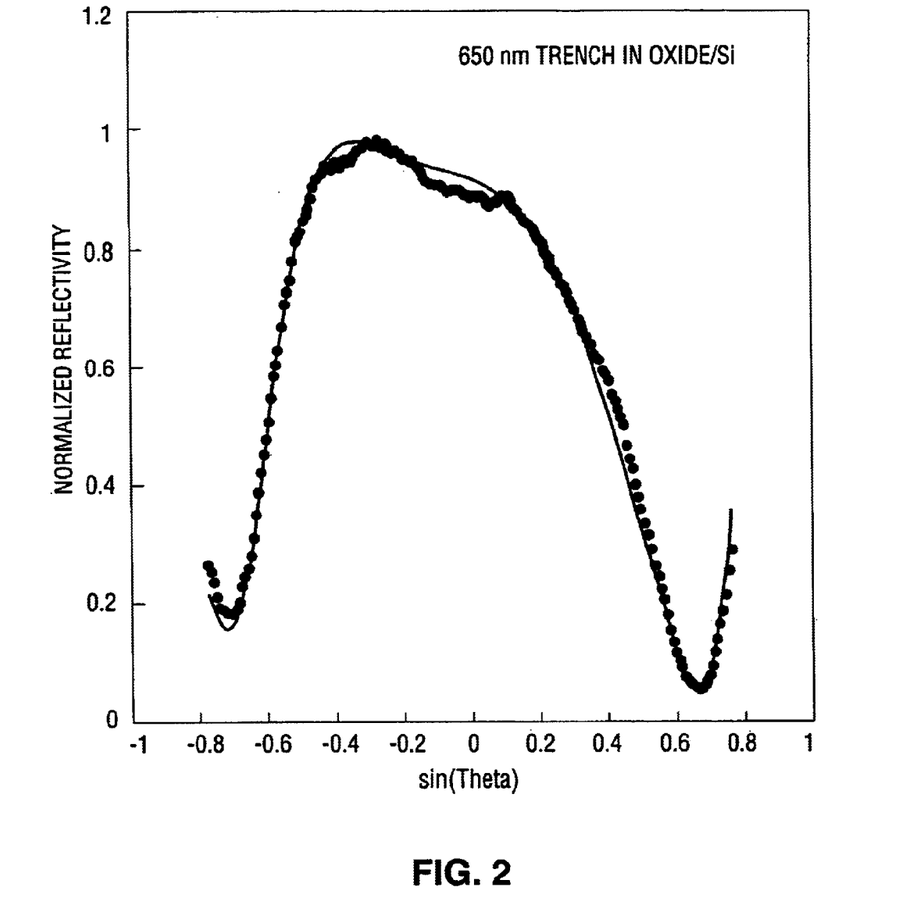
FIG. 2 is a graph of normalized reflectivity as a function of angle of incidence and comparing actual measured data to predicted data associated with an isolated trench.
Figure 3:
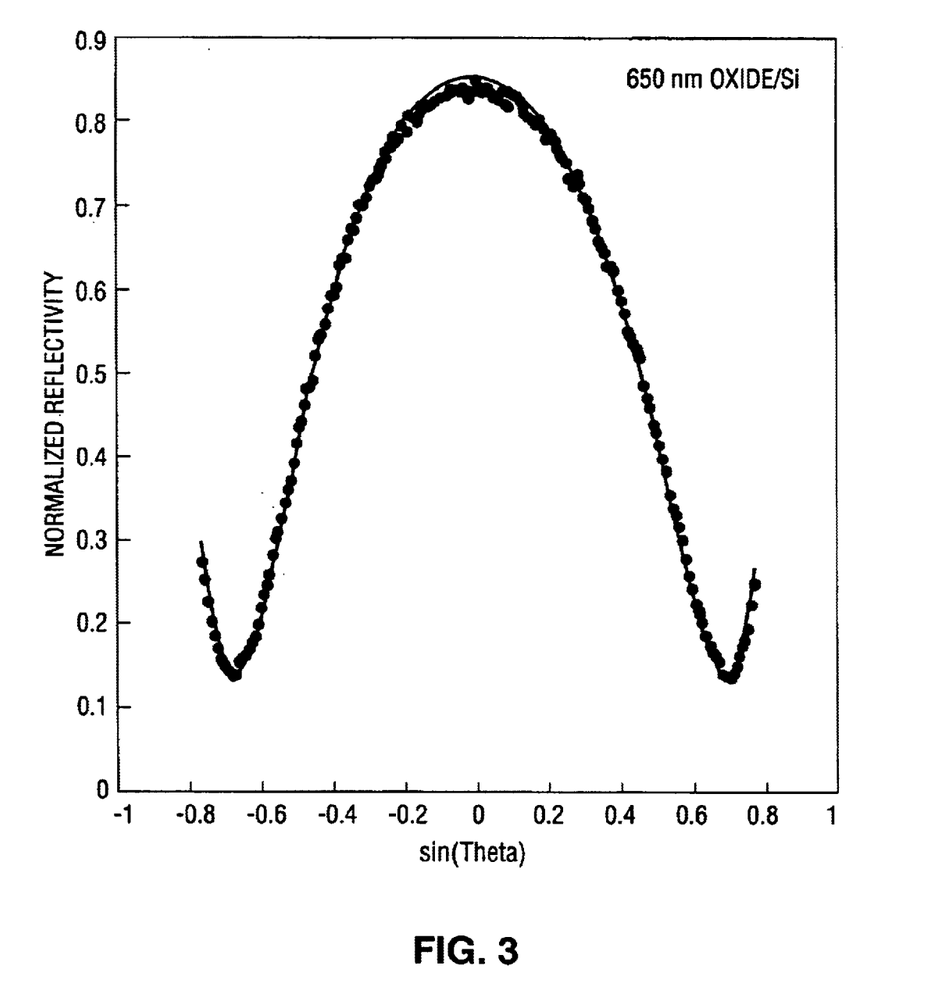
FIG. 3 is a graph of normalized reflectivity as a function of angle of incidence and comparing actual measured data to predicted data associated with an unpatterned thin film.

FIGS. 2 and 3 illustrate measurements made on the sample wafer. FIG. 2 illustrates measurements with the probe beam over the trench while FIG. 3 illustrates measurements with the probe beam positioned on an unpatterned portion of the wafer. In each Figure, the circles represent actual measurements plotted as a function of angle of incidence. The smooth lines represent a theoretical fit of the data.

Figure 4:
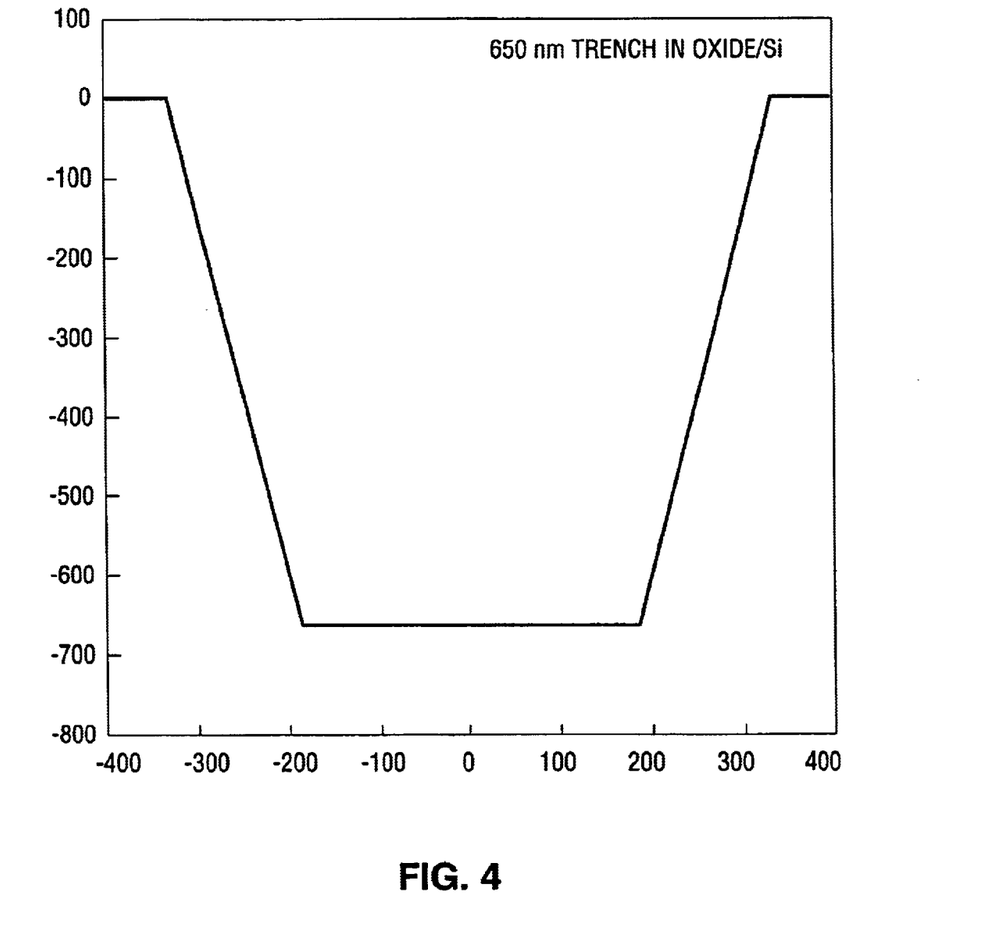
FIG. 4 is a cross-section shape of a trench predicted by an analysis of the measured data illustrated in FIG. 2.

The differences between the data in FIGS. 2 and 3 illustrate that a single narrow trench in the field of view effects the BPR measurement. The parameters used to create the solid line in FIG. 2 are based on a trench having dimensions illustrated in FIG. 4. These initial experiments fully demonstrate the feasibility of using BPR to measure a small, isolated, aperiodic feature on a semiconductor sample.

The subject invention is not limited specifically to the BPR arrangement illustrated above. For example, various other forms of detector arrays can be used. In particular, it is feasible to replace one or both of the arrays with a two dimensional array such as a CCD. Those skilled in the art will readily be able to envision other modifications, including those described in the patent documents cited herein.

As noted above, the output of the detector elements includes both a specularly reflected component and a scattered light component. It may be desirable to minimize the specularly reflected component and maximize the scattered light component. This can be important if the primary interest is in characterizing the physical structure of the scatterer and less information is needed about the underlying structure.

One approach for achieving the latter goal is described in copending provisional application Ser. No. 60/394,201 filed Jul. 5, 2002, assigned to the same assignee herein and incorporated by reference. This disclosure proposes inserting a baffle 80 (shown in phantom in FIG. 1) into a portion of the probe beam path. The baffle is intended to block a semi-circular portion of the probe beam. In this arrangement, light in the left hand portion of the incident beam reaches the sample while light in the right hand portion of the incident beam is blocked. Specularly reflected light is collected by the right hand side of lens 40 but is blocked from reaching the detector by baffle 80. In contrast, only light which has been scattered from the sample and captured by the left hand side of the lens will reach the detector. In this manner, the light reaching the detector will be primarily scattered light and not specularly reflected light. Additional measurements can be taken after moving the baffle to block the left hand side of the incident beam.

As can be appreciated, with a baffle in place, the output generated by the detectors does not correspond to specific incidence angles as in a conventional BPR arrangement. Rather, the detectors measure an integration of scattered light from various angles of incidence.

A measurement system including a baffle in the manner describe above can be used to measure scattered light from both isolated structures as well as periodic structures. Although the use of a baffle is not presently claimed in this application, it is intended that the scope of the claims include such an embodiment.

The subject method is not limited to reflectometry. As noted in U.S. Pat. Nos. 5,042,951 and 5,166,752 (incorporated herein by reference), it is also possible to obtain ellipsometric measurements corresponding to $\psi$ and $\Delta$ simultaneously at multiple angles of incidence. To obtain such measurements, some additional optical elements should be added to the device of FIG. 1. For example, a polarizer 66 (shown in phantom) is desirable to accurately predetermine the polarization state of the probe beam. On the detection side, an analyzer 68 (also shown in phantom) is provided to aid in analyzing the change in polarization state of the probe beam due to interaction with the sample. The optical components of the analyzer can be of any type typically used in an ellipsometer such as a polarizer or a retarder. The ellipsometric output signals are analyzed in a fashion similar to the prior art approaches for using ellipsometric data to evaluate the geometry of an aperiodic structures.

U.S. Pat. No. 5,181,080 describes a variant of the BPE approach. In this system, a quadrant detector is used to measure the power of the reflected probe beam along two orthogonal axes. Each quadrant generates a response proportional to the integration of all angles of incidence. By manipulating the output of the quadrants, ellipsometric information can be derived.

It is also within the scope of the subject invention to combine the BPR and BPE measurements with other measurements that might be available from a composite tool. As noted above, the assignee's Opti-Probe device has multiple measurement technologies in addition to the Beam Profile Reflectometry system. These other technologies include broadband reflectometry and broadband ellipsometry. In these measurement technologies, an incoherent polychromatic probe beam is focused onto the sample. The reflected polychromatic probe beam is monitored at a plurality of wavelengths. In reflectometry, changes in intensity of the polychromatic probe beam are monitored. In ellipsometry, changes in polarization state of the polychromatic probe beam are monitored. The output from these additional modules might be useable in combination with the BPR and BPE signals to more accurately evaluate the geometry of the isolated structure.

As can be appreciated, most of the basic hardware elements discussed herein have been known in the prior art. The developments intended to be covered by this disclosure relate to certain applications of that technology. More specifically, it is believed that the BPR and BPE techniques can be used to measure isolated, single (non-repeating) structures which have dimensions in the micron and submicron range. These would include, for example, single lines, single vias, single holes and single trenches. It is believed that by focusing a coherent probe beam on the structure and measuring the reflected response, one can rely on scattered light effects to determine the geometry of the structure.

It may also be possible to evaluate a single structure that was larger than the probe beam spot (i.e. was only partially illuminated). By measuring scattered light effects, and with some a priori knowledge of the structure, one may be able to determine the geometry of the structure which is being illuminated.

The subject invention is also intended to cover the situation where a periodic structure has a size or extent smaller than the probe beam spot. For example, consider a repeating structure having only five or ten lines. If the probe beam spot is greater than the structure, the reflected field would be aperiodic and could not be analyzed with a grating approach. However, using the techniques described herein one could still derive information about the sample. In this case, it is assumed that the probe beam spot size would be at least about twice the width of the structure so the grating effects would be minimal.

Although initial experiments have shown that isolated and aperiodic structures can be monitored with the probe beam spatially fixed with respect to the feature, it is within the scope of the subject invention to scan the probe beam with respect to the feature. In such a case, measurements are taken at various positions of the probe beam and the data combined to analyze the sample. Such an approach may be particularly useful with a system operating in accordance with U.S. Pat. No. 5,181,080, discussed above. The relative motion of the probe beam with respect to the sample can be achieved using a conventional motion stage. It is also possible to move the optics. (See for example, PCT WO 00/57127.)

While the subject invention has been described with reference to a preferred embodiment, various changes and modifications could be made therein, by one skilled in the art, without varying from the scope and spirit of the subject invention as defined by the appended claims.

We claim:

1. A method for evaluating the geometry of an aperiodic structure formed on a sample, said method comprising the steps of:

generating a probe beam of radiation from a coherent light source;

focusing the probe beam substantially normal onto the aperiodic structure to create a spread of angles of incidence that extends from the normal to at least sixty degrees;

monitoring the light from the probe beam diffracted from the structure with an array of photodetecting elements and simultaneously generating a plurality of independent output signals corresponding to a range of angles of incidence from the normal of sixty degrees; and evaluating the geometry of the structure based on the output signals using an analysis which treats the structure as being aperiodic.

2. A method for evaluating the geometry of a structure formed on a sample, said method comprising the steps of:

generating a probe beam of radiation from a coherent light source;

focusing the probe beam substantially normal onto the structure to create a spread of angles of incidence that extends from the normal to at least sixty degrees where the illuminated field is aperiodic;

monitoring the light from the probe beam diffracted from the structure with an array of photodetecting elements and simultaneously generating a plurality of independent output signals corresponding to a range of angles of incidence from the normal of sixty degrees; and evaluating the geometry of the structure based on the output signals using an analysis which treats the structure as being aperiodic.

3. A method for evaluating the geometry of a structure formed on a sample, said structure being defined by ten or fewer longitudinally extending lines, with the width of the structure extending perpendicular to the extending lines, said method comprising the steps of:

generating a probe beam of radiation from a coherent light source;

focusing the probe beam substantially normal onto the sample to create a spread of angles of incidence that extends from the normal to at least sixty degrees, wherein the diameter of the focused spot is at least twice the size of the width of the structure;

monitoring the light from the probe beam diffracted from the structure with an array of photodetecting elements and simultaneously generating a plurality of independent output signals corresponding to a range of angles of incidence from the normal of sixty degrees; and evaluating the geometry of the structure based on the output signals.

4. A method for evaluating the geometry of an aperiodic structure formed on a sample, said method comprising the steps of:

generating a probe beam of radiation from a coherent light source;

focusing the probe beam substantially normal onto the aperiodic structure to create a spread of angles of incidence that extends from the normal to at least sixty degrees;

monitoring the light from the probe beam diffracted from the structure along two orthogonal axes and generating an output that integrates the intensity of the rays having different angles of incidence that extends from the normal to at least sixty degrees; and evaluating the geometry of the structure based on the output signals using an analysis which treats the structure as being aperiodic.

5. A method as recited in any of claims 1, 2 or 4, wherein the structure is an isolated feature.

6. A method as recited in any of claims 1, 2 or 4, wherein the structure is an isolated feature selected from the group consisting of a line, a hole, a via, a trench and a overlay registration marking.

7. A method as recited in any of claims 1 to 4, wherein the probe beam is focused to spot less than five microns in diameter.

8. A method as recited in any of claims 1 to 4, wherein the probe beam is focused to spot less than two microns in diameter.

9. A method as recited in any of claims 1 to 3, wherein the intensity of the probe beam light is monitored.

10. A method as recited in any of claims 1 to 4, wherein the change in polarization state of the probe beam light is monitored.

11. A method as recited in any of claims 1 to 4, wherein probe beam light is generated by a laser diode.

12. A method as recited in one of claims 1 to 4, wherein the probe beam is scanned with respect to the structure being evaluated.

13. A method as recited in claims 1 to 4, further including the steps of:
 illuminating the structure with an incoherent polychromatic probe beam;
 monitoring the reflected polychromatic probe beam; and
 generating second output signals corresponding to a plurality of wavelengths and wherein the geometry of the structure is evaluated based on a combination of the output signals corresponding to a plurality of different angles of incidence and the second output signals.

14. A method as recited in claim 13, wherein changes in intensity of the polychromatic probe beam are monitored.

15. A method as recited in claim 13, wherein changes in polarization state of the polychromatic probe beam are monitored.

* * * * *